Sept. 18, 1951  R. L. HERRING  2,568,628
ROTATABLE TRAY FOR MOTOR VEHICLE LUGGAGE COMPARTMENTS
Filed Oct. 8, 1949
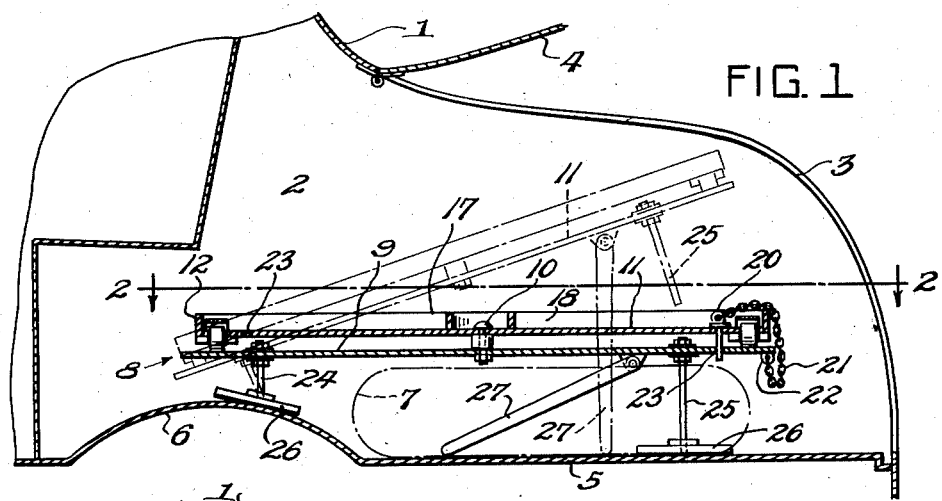
FIG. 1
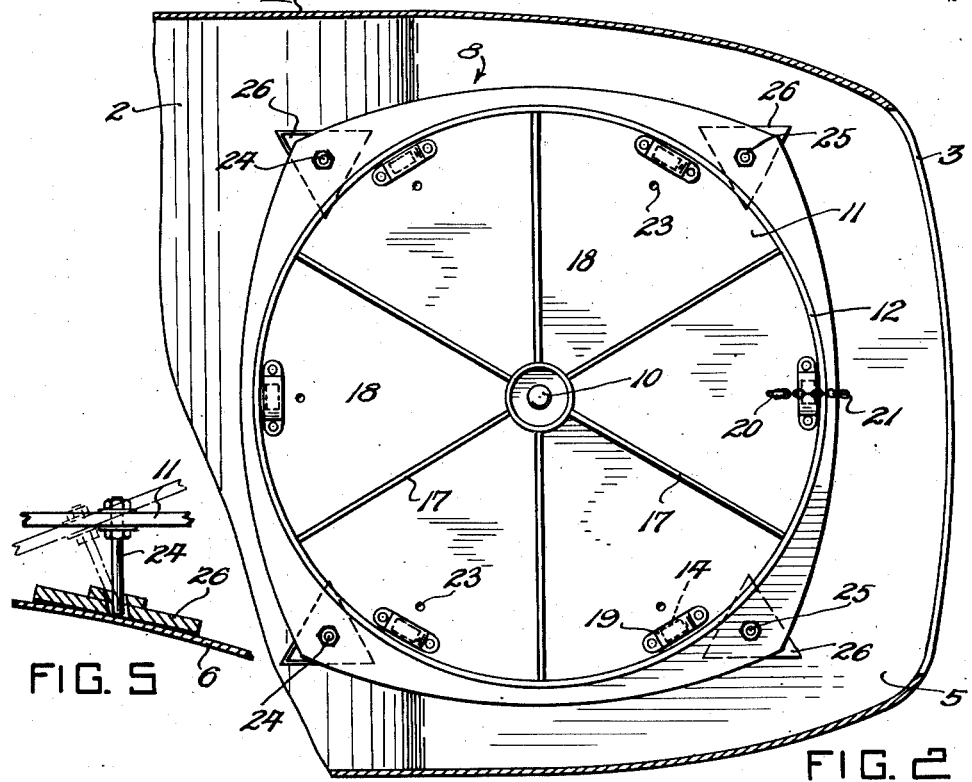
FIG. 5
FIG. 2
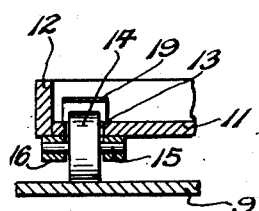
FIG. 3
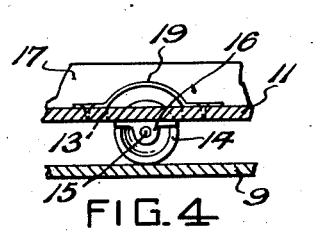
FIG. 4
INVENTOR.
R. L. Herring
BY
ATTORNEY Patented Sept. 18, 1951

2,568,628

UNITED STATES PATENT OFFICE 2,568,628

ROTATABLE TRAY FOR MOTOR VEHICLE LUGGAGE COMPARTMENTS

Raymond L. Herring, Pataskala, Ohio

Application October 8, 1949, Serial No. 120,333

3 Claims. (Cl. 224—42.43)

This invention relates to an improved turnable article-supporting means for use in the rear luggage compartment of automobile bodies, an object of the invention being to provide a table for installation in such a luggage compartment which is supported for rotation in a horizontal plane about a central axis, so that by turning the table various articles or products arranged thereon will be readily accessible.

Automobiles are employed quite often to transfort in the luggage compartments thereof a multiplicity of relatively small-sized articles or bodies, for example, boxes, bottles, jars, tools, cans, and the like. The design and space limitations of the usual storage compartment at the rear of an automobile body quite commonly offer difficulties in the matter of quickly and easily locating in and removing from such a compartment miscellaneous articles of the character indicated.

Realizing these conditions, the prior art has proposed to provide such compartments with frames for effecting the sliding longitudinal support of trays, drawers or decks on which various articles may be carried, so that such trays or decks may be moved to forward positions, whereby to secure better access to articles deposited thereon. Such prior constructions are, however, characterized by their mechanical complication, relatively high costs and difficulties in effecting their installation in and removal from associated vehicle body compartments.

In lieu of providing such sliding supports, the present invention is characterized by the provision of a rotatable supporting deck or table, which is mounted so that while it maintains a definite position in the luggage compartment, it nevertheless may be rotated to enable all the products deposited thereon to be conveniently reached through the access opening of the compartment.

It is another object of the invention to provide a turnable luggage support of the character set forth which can be easily installed in an associated compartment of a motor vehicle body and removed from such compartment.

It is another object of the invention to provide a luggage support of this character which embodies a base plate supported above the floor of the luggage storage compartment, and wherein the base plate is provided on the top thereof with a turnable table or deck adapted for the reception of various products to be supported and stored in the compartment, the spacing of the base plate from the floor of the compartment being such as to permit an automobile spare tire to be stored in the compartment beneath said base plate.

A still further object is to provide a device of this kind in which the base plate is pivotally mounted so that it may be supported in a raised posiion to provide more convenient access to a spare tire disposed beneath the same.

Other features and advantages of the invention will be apparent by reference to the following description and the accompanying drawings, wherein:

Fig. 1 is a vertical longitudinal sectional view taken through the luggage compartment of a motor vehicle body, and illustrating in full lines the improved turnable luggage-supporting appliance comprising the present invention in its operative position within said compartment, the appliance being shown in broken lines in an elevated and inactive position in which it is disposed in angular relation to the horizontal;

Fig. 2 is a horizontal sectional view taken on the plane indicated by the line 2—2 of Fig. 1;

Fig. 3 is a detail sectional view disclosing one of the table deck carried supporting rollers:

Fig. 4 is a similar view looking at the front of the roller.

Fig. 5 is a detail vertical sectional view, disclosing one of the supporting hinge bolts of the appliance and a floor mounted socket plate for the reception thereof.

Referring to the drawings, the numeral 1 designates the body of an automobile, the same being provided with the usual rearwardly disposed luggage-receiving compartment 2, the access opening 3 of which being opened or closed by means of the swinging lid or cover 4. The floor of the compartment is indicated by the numeral 5, said floor being shown as provided with the usual wheel-clearance convexity 6. Adapted to be removably positioned on the floor 5 is a spare wheel or tire 7, the same in this instance being shown as resting on its side in a substantially horizontal plane.

In order to provide a means for enabling various articles positioned in the compartments to be rendered more conveniently accessible through the access opening 3, the present invention provides a turnable article-supporting device which is designated in its entirety by the numeral 8. In its preferred form, the device comprises a base plate 9 which is adapted to be disposed in a substantially horizontal plane so that it will be arranged above the wheel or tire 7 and supported on the floor 5. Centrally, the plate 9 is provided with an upstanding bolt 10 by which there is joined to said plate for turning movement about the vertical axis represented by the bolt 10 an article-carrying table or deck 11. The latter is preferably of circular form, as indicated more particularly in Fig. 2, and is formed with a peripheral upstanding flange 12. Adjacent to this flange, the table or deck is slotted as at 13 for the reception of a plurality of rollers 14, the latter being carried by axles 15 supported in bearings 16 depending from the under surfaces of the deck, the rollers having direct engagement and being supported by the upper surface of the base plate 9. Also, these rollers may be covered by shrouds 19 carried by the upper surfaces of the deck 11 and projecting over the slots 13.

If desired, the table or deck 11 may be provided with radially extending divisional webs 17 which form between them shallow compartments 18 in which may be received a multiplicity of many different kinds of objects or bodies adapted to be transported in a motor vehicle, particularly relatively small sized articles or objects, and which would be difficult to locate if placed at random in a conventional automobile luggage compartment.

It will be seen that by rotating the table or deck 11, any particular compartment or section thereof may be presented to the front of the luggage compartment 2 or it may be conveniently reached through the opening 3. Similar facility is, of course, obtained in loading articles on the table or deck. To retain the table or deck against rotation during automobile operation, I may employ a pin 20 carried by a chain 21 which is attached to an eye 22 provided on the lower part of the base plate 9. The shank of the pin 20 is adapted to extend through registering openings 23 provided in the table 11 and the base plate 9. When it is desired to rotate the table, the pin 20 is removed from the openings 23, thus disengaging the table and permitting the same to revolve readily on its rollers 14 about the axis provided by the bolt 10.

To support the appliance within the compartment 2, the base plate 9 is provided at its rear, that is, rear when viewed by one standing contiguous to the access opening 3, with hinge bolts 24, which permit the appliance to be elevated to the angular position indicated in broken lines in Fig. 1, so that access to the spare tire 7 may be conveniently had. At its front, near the access opening 3, the base plate is provided with depending legs 25 which engage with pads 26 cemented or otherwise secured to the upper surface of the floor 5. A swinging prop 27 may be connected to the under side of the plate 9 to sustain the latter in its elevated position without holding the same, when an operator is working on the spare tire.

My improved construction lends itself readily to being produced by factory methods and also the same is easy and convenient to install or remove in or from an associated motor vehicle. By being associated with the cemented pads 26, it is not necessary to drill holes in the floor construction of the vehicle compartment. The device may be readily lifted from the luggage compartment, leaving only the pads 26 in their applied positions.

I claim:

1. Turnable article-supporting apparatus for installation in automobile luggage-storage compartments comprising: a base plate, leg means for removably supporting said base plate above the floor of an automobile luggage-storage compartment normally in a substantially horizontal plane, an article-receiving table member supported on said base plate for turning movement about a substantially vertical axis, means for fastening said table member to said base plate to resist turning thereof, a plurality of antifriction supporting rollers carried by the peripheral portion of said table member for supporting engagement with the upper surface of said base plate, means providing for bodily tilting movement of said base plate and said table member, and prop means for retaining said base plate and its table member in an elevated inactive position.

2. Turnable article-supporting apparatus for installation in automobile luggage-storage compartments, comprising: a base plate, a plurality of relatively spaced vertically depending leg members rigidly joined at their upper ends with said base plate, socketed pad devices stationarily mounted on the floor of an associated storage compartment for the reception of the lower ends of said leg members, said leg members having their lower ends removably received in the sockets of said pad devices, an article receiving table member arranged above said base plate, and means pivotally mounting said table member on said base plate for turning movement about a substantially vertical axis passing through the center of said table member.

3. Turnable article-supporting apparatus for installation in automobile luggage-storage compartments as defined in claim 2, and wherein said table is provided contiguous to its outer circumferential portion with spaced roller means engageable with the upper surface of said base plate and operating to facilitate turning movement of said table about said vertical axis, and pivotal prop means carried by the under side of said base plate, said prop means being engageable with the floor of an associated luggage compartment for supporting said base plate and table in tiltable positions of operation in which said base plate and table member are disposed in angular relation to the horizontal.

RAYMOND L. HERRING.

REFERENCES CITED

The following references are of record in the file of this patent:

UNITED STATES PATENTS

| Number | Name | Date |
| --- | --- | --- |
| 2,062,807 | Cramer | Dec. 1, 1936 |
| 2,091,071 | Girl | Aug. 24, 1937 |
| 2,141,001 | Horsley | Dec. 20, 1938 |
| 2,193,384 | Vunovich | Mar. 12, 1940 |
| 2,244,872 | Fergueson | June 10, 1941 |
| 2,337,505 | Swift | Dec. 21, 1943 |

FOREIGN PATENTS

| Number | Country | Date |
| --- | --- | --- |
| 469,501 | Great Britain | July 27, 1937 |